Feb. 26, 1935.  G. M. MERWIN  1,992,437
CUTTING MECHANISM FOR ENSILAGE CUTTERS
Filed Feb. 23, 1933

Inventor
George M Merwin

Patented Feb. 26, 1935

1,992,437

UNITED STATES PATENT OFFICE 1,992,437

CUTTING MECHANISM FOR ENSILAGE CUTTERS

George M. Merwin, Berwyn, Ill., assignor to International Harvester Company, a corporation of New Jersey Application February 23, 1933, Serial No. 658,002

3 Claims. (Cl. 146—109)

This invention relates to improvements in ensilage cutters. More specifically it relates to improvements in the cutting mechanism for such machines.

A principal object of the invention is to provide means for improving the cutting action of the shearing type of cutting machines as used in conventional ensilage cutters.

Another principal object is to provide means for guiding the cutting blades adjacent the cooperating cutting blade with a minimum amount of clearance without the possibility of injuring the cutting edges.

These and other objects, which will be apparent from the detailed description to follow, are accomplished by a construction such as shown in the drawing, in which.

Figure 1:
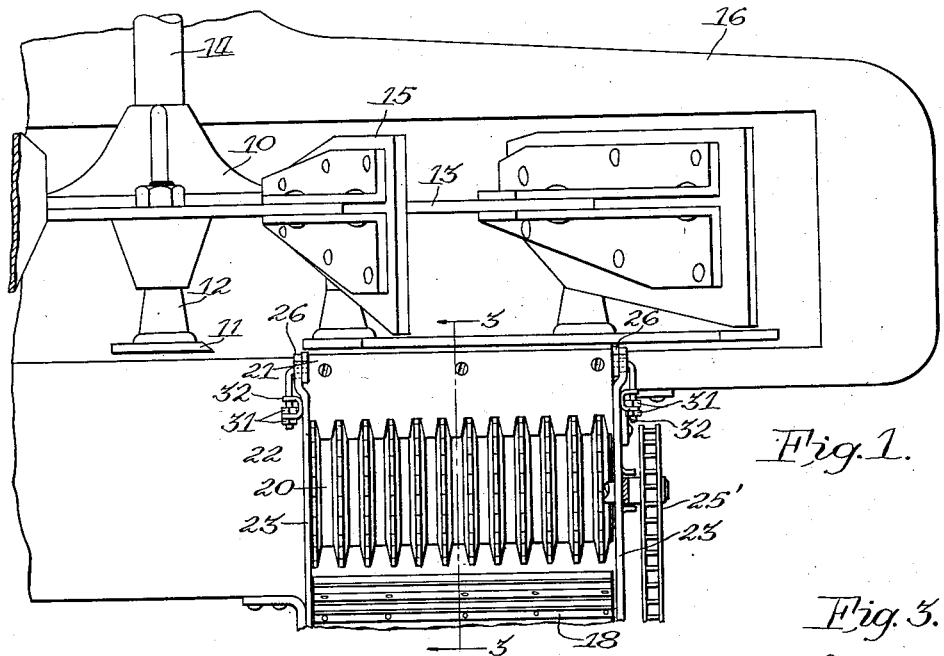
Figure 1 is a plan view with the upper half of the housing for the rotor and the cover for the feed table removed.

In the illustrative machine there is provided a combined cutter and blower 10 having stalk cutting blades or knives 11 mounted by means of posts 12 on a circular steel plate 13. Said plate is mounted by means of a hub for rotation on a shaft 14. Fan blades 15 are also mounted on the plate 13. The shaft 14 and the entire rotor which is carried thereby, are rotatably mounted in a housing, the lower half 16 of which is shown in the drawing. In the particular construction illustrated an integral one piece casting is used as a supporting structure for the rotor and for various other elements, including the forward end of the feed table 17. Only such elements have been shown as are necessary to illustrate the features of the present invention. The U. S. Patent No. 1,769,163, July 1, 1930, shows in detail and describes an ensilage cutter of the type on which the present invention is to be embodied.

The forward end of the feed table 17, as previously stated, is secured to the supporting structure or housing 16. An endless feed apron 18 of a conventional construction is mounted on the feed table. The forward end of the apron is supported by a toothed member 19, which is rotatably supported on the feed table in spaced relation with respect to the cutter end thereof. A feed roller 20, which is provided with regularly spaced circumferential rows of teeth, is rotatably mounted between the forward end of the apron 18 and a cutter plate 21, which is fixed on the forward end of the feed table. A plurality of spaced notches 22 on said plate cooperatively engage with the teeth formed on the roller 20. The forward edge of the plate 21 has a beveled cutting edge which extends beyond the end of the feed table whereby it may be brought into shearing relationship with respect to the cutter blades 11 carried on the rotor. Adjustments may be provided for bringing the plate into very close relationship with respect to the blades 11. As described in the patent previously referred to, this adjustment is very important as the best cutting action is obtained when the blades are adjusted for shearing with a minimum of clearance.

Figure 2:
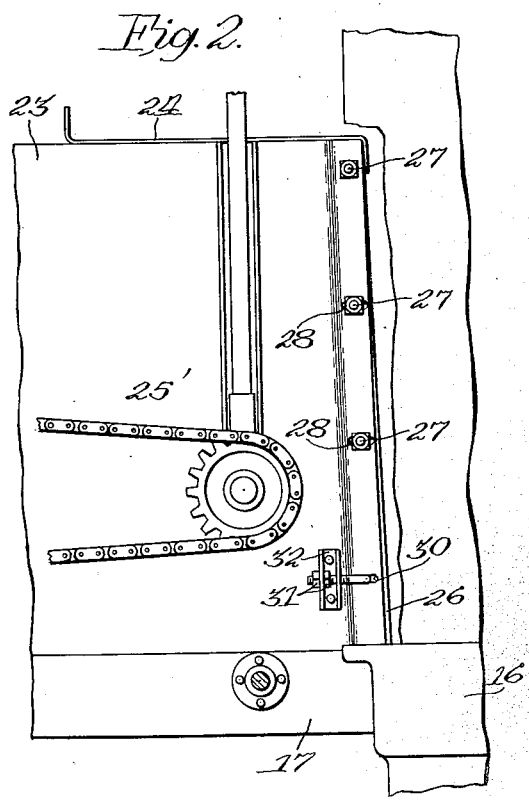
Figure 2 is a side elevation of the end of the feed table adjacent the housing and a portion of the housing, this figure being broken away to better show a feature of the invention.
Figure 3:
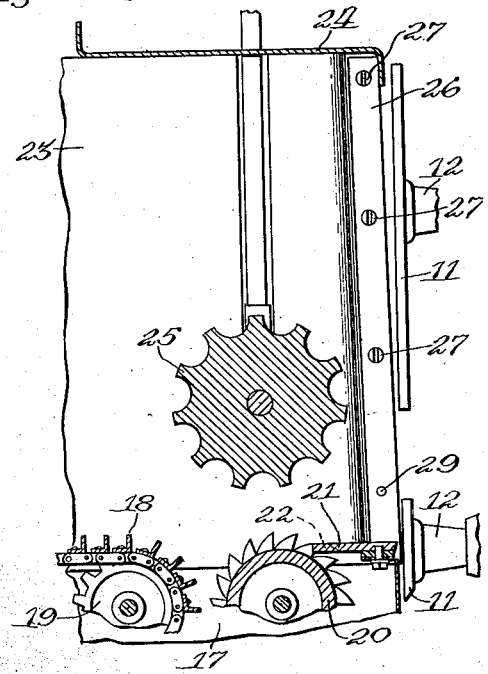
Figure 3 is a vertical section taken on the line 3—3 of Figure 1.

Side walls 23 are provided at the forward end of the feed table. These walls extend vertically upward and are connected by a top wall 24. A presser roller 25 of a conventional construction is rotatably and slidably mounted between the side walls 23. Said roller is driven by a universal shaft. As this construction is conventional, only the parts which might be considered as cooperating with the elements making up the invention, have been shown. At the ends of the side walls 23, adjacent the rotor, vertically extending cutter bars 26 are secured by a plurality of bolts 27. As illustrated in Figure 2, the top bolt in each bar extends through aligned openings in the bar and in the side wall. The bolts below said bolt extend through openings in the bar, and slots 28 in the side wall. At the lower end of the bar a hook bolt 29 is provided which extends through a slot 30 in the side wall into an opening in the bar. The bolt 29 is adjustably secured by spaced nuts 31 to a bracket 32 mounted on the side wall. It will be noted that the bar 26 has been shown as extending at a slight angle outwardly at the bottom towards the rotor of the machine. It will also be noted in Figure 3 that the lower end of the bar extends a slight distance beyond the cutting edge of the plate 21. This has perhaps been exaggerated somewhat in order to illustrate that feature of the invention.

By loosening the bolts 27 it will be understood that the bar 26 may be adjusted about the upper bolt 27 as a pivot by loosening one of the nuts 31 and tightening the other. By this adjustment the lower end of the bar may be brought to the desired position with respect to the cutter blades or knives 11 and the cutter plate 21.

It will be noted that the feed table 17 is at one side of the axis of rotation of the rotor. With this relative position of the feed table and the cutter plate 21 there is a shearing action even with the blades 11 positioned radially, which first begins at the end of the cutter plate adjacent the axis of rotation and extends progressively across the plate. It is also evident that the cutter blades, when positioned radially, first come into shearing relationship with respect to the vertical bars 26 at their upper ends and progressively shear downwardly along said bars. By providing a flat forward edge on said bars and by arranging the bars at a slight angle contact of the cutter blades with the bars engages slowly and evenly without damage to either the bars or the cutter blades. Although such a contact is not to be preferred it may come about due to slight misadjustments and wear of the machine, also due to strains on the machine when heavy material is fed thereinto. Relative positions of the lower ends of the bars 26 with respect to the plate 21 prevent any possible injury to said plate by contact therewith of the cutting edges of the blades 11. The bars 26 therefore serve as a means to protect the cutting edges of the blades 11 and the plate 21.

The bars 26 also have another function. When feeding the machine at full capacity material is pushed into the corners of the feed table, particularly at the side away from the axis of the rotor. By the construction as described the vertical bar 26 acts in connection with the rotating blades as a cutter plate and material which is pushed to that side of the feed table is sheared between the cutter bar 26 and the blades 11.

It will be understood that applicant has shown and described only a preferred embodiment of his improved cutting means for ensilage cutters and that he claims as his invention all modifications falling within the scope of the appended clams.

What is claimed is:

1. In an ensilage cutter having a supporting structure and a rotor mounted thereon, and in combination therewith cutter blades mounted on one radial face of said rotor, a horizontal cutter plate rigidly mounted with respect to the supporting structure in shearing relationship with respect to the cutter blades on the rotor, upwardly extending supporting means adjacent the cutter plate, vertical cutter bars mounted on said means in shearing relationship with respect to the cutter blades of the rotor, and means for adjusting the lower ends of the vertical bars axially of the rotor and relative to the horizontal cutter plate whereby the vertical bars serve as protectors to guard the cutter blades from engaging the cutter plate.

2. In an ensilage cutter having a supporting structure and a rotor mounted thereon, and in combination therewith cutter blades mounted on one radial face of said rotor, a cutter plate rigidly mounted with respect to the supporting structure in shearing relationship with respect to the cutter blades on the rotor, upwardly extending supporting means adjacent the cutter plate, cutter bars mounted on said means in shearing relationship with respect to the cutter blades of the rotor, and means for adjusting the ends of said bars adjacent the cutter plate with respect to the cutter blades on the rotor and relative to the horizontal cutter plate whereby the vertical bars serve as protectors to guard the cutter blades from engaging the cutter plate.

3. In an ensilage cutter having a supporting structure and a rotor mounted thereon, and in combination therewith cutter blades mounted on one radial face of said rotor, a feed table substantially perpendicular to the face of the rotor and positioned to one side of the axis of said rotor, a cutter plate mounted on said table in shearing relationship with respect to the cutter blades on the rotor, upwardly extending supporting means adjacent the cutter plate, cutter bars mounted on said means in shearing relationship with respect to the cutting blades of the rotor, and means for adjusting the ends of said bars adjacent the cutter blade whereby said ends may be maintained slightly beyond the cutter plate in an axial direction toward the cutter blades whereby the cutter bars serve as protectors to guard the cutter blades from engaging the cutter plate.

GEORGE M. MERWIN.